United States Patent
Klebanov

(10) Patent No.: US 7,158,140 B1
(45) Date of Patent: Jan. 2, 2007

(54) METHOD AND APPARATUS FOR RENDERING AN IMAGE IN A VIDEO GRAPHICS ADAPTER

(75) Inventor: Ilya Klebanov, Vaughan (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/270,256

(22) Filed: Mar. 15, 1999

(51) Int. Cl.
G06F 15/16 (2006.01)
G06F 15/167 (2006.01)

(52) U.S. Cl. .................................. 345/502; 345/541

(58) Field of Classification Search ............. 345/1.3, 345/502, 504, 537, 547, 2.2, 3.1, 1.1, 1.2, 345/541, 806, 781, 2.1, 856
See application file for complete search history.

(56) References Cited

U.S. PATENT DOCUMENTS

| | | | | |
|---|---|---|---|---|
| 4,695,966 A | * | 9/1987 | Takakura et al. | 345/536 |
| 4,760,388 A | | 7/1988 | Tatsumi et al. | |
| 4,876,651 A | * | 10/1989 | Dawson et al. | 340/995 |
| 4,897,812 A | * | 1/1990 | Lessard et al. | 345/501 |
| 4,949,169 A | * | 8/1990 | Lumelsky et al. | 348/14.12 |
| 4,949,279 A | * | 8/1990 | Takakura et al. | 345/418 |
| 4,965,559 A | * | 10/1990 | Dye | 345/2.2 |
| 5,014,128 A | * | 5/1991 | Chen | 348/448 |
| 5,018,076 A | * | 5/1991 | Johary et al. | 345/1.3 |
| 5,113,517 A | * | 5/1992 | Beard et al. | 703/23 |
| 5,119,080 A | * | 6/1992 | Kajimoto et al. | 345/620 |
| 5,254,984 A | * | 10/1993 | Wakeland | 345/540 |
| 5,275,565 A | * | 1/1994 | Moncrief | 345/1.3 |
| 5,361,078 A | * | 11/1994 | Caine | 345/1.3 |
| 5,374,940 A | * | 12/1994 | Corio | 345/1 |
| 5,379,052 A | * | 1/1995 | Walck et al. | 345/541 |
| 5,396,257 A | * | 3/1995 | Someya et al. | 345/1.1 |
| 5,434,590 A | * | 7/1995 | Dinwiddie et al. | 345/520 |
| 5,454,075 A | * | 9/1995 | Kudo | 345/536 |
| 5,461,679 A | * | 10/1995 | Normile et al. | 382/304 |
| 5,471,577 A | * | 11/1995 | Lightbody et al. | 345/837 |
| 5,500,654 A | * | 3/1996 | Fujimoto | 345/634 |
| 5,523,769 A | * | 6/1996 | Lauer et al. | 345/1.3 |
| 5,526,024 A | * | 6/1996 | Gaglianello et al. | 345/547 |
| 5,557,734 A | * | 9/1996 | Wilson | 345/505 |
| 5,559,525 A | * | 9/1996 | Zenda | 345/3.1 |
| 5,574,836 A | * | 11/1996 | Broemmelsiek | 345/421 |
| 5,657,046 A | * | 8/1997 | Noble et al. | 345/1.3 |
| 5,694,141 A | * | 12/1997 | Chee | 345/3.1 |
| 5,694,150 A | * | 12/1997 | Sigona et al. | 345/145 |
| 5,712,664 A | * | 1/1998 | Reddy | 345/519 |
| 5,736,968 A | * | 4/1998 | Tsakiris | 345/2.2 |
| 5,764,964 A | * | 6/1998 | Dwin et al. | 345/546 |
| 5,784,035 A | * | 7/1998 | Hagiwara et al. | 345/1.3 |
| 5,838,334 A | * | 11/1998 | Dye | 345/503 |
| 5,874,928 A | * | 2/1999 | Kou | 345/1.1 |
| 5,923,307 A | * | 7/1999 | Hogle, IV | 345/4 |
| 5,926,187 A | * | 7/1999 | Kim | 345/619 |
| 5,943,064 A | * | 8/1999 | Hong | 345/546 |

(Continued)

*Primary Examiner*—Ryan Yang
(74) *Attorney, Agent, or Firm*—Vedder, Price, Kaufman & Kammholz, P.C.

(57) ABSTRACT

In accordance with the invention, a video source is received by a first video adapter. The video source is captured in the video memory associated with the first VGA. The stored video source is associated with a window of an existing application. When the window location of the existing application is shifted to coincide with the video memory of a second graphics adapter, a data transfer occurs to the appropriate video memory location of the second graphics adapter to allow the rendering of that portion of the video now residing on a second monitor.

25 Claims, 4 Drawing Sheets

U.S. PATENT DOCUMENTS

| | | | |
|---|---|---|---|
| 5,956,046 A * | 9/1999 | Kehlet et al. | 345/502 |
| 5,959,639 A * | 9/1999 | Wada | 345/542 |
| 5,977,933 A * | 11/1999 | Wicher et al. | 345/3.1 |
| 6,020,890 A * | 2/2000 | Kohda | 345/419 |
| 6,072,476 A * | 6/2000 | Harada et al. | 345/204 |
| 6,088,005 A * | 7/2000 | Walls et al. | 345/4 |
| 6,219,695 B1 * | 4/2001 | Guttag et al. | 709/217 |
| 6,262,695 B1 * | 7/2001 | McGowan | 345/1.1 |
| 6,292,200 B1 * | 9/2001 | Bowen et al. | 345/506 |
| 6,297,785 B1 * | 10/2001 | Sommer et al. | 345/1.1 |
| 6,297,817 B1 * | 10/2001 | Larson et al. | 345/213 |
| 6,323,854 B1 * | 11/2001 | Knox et al. | 345/418 |
| 6,340,959 B1 * | 1/2002 | Inamori | 345/3.1 |
| 6,344,836 B1 * | 2/2002 | Suzuki | 345/2.1 |
| 6,501,441 B1 * | 12/2002 | Ludtke et al. | 345/1.1 |
| 6,509,911 B1 * | 1/2003 | Shimotono | 345/761 |
| 6,573,913 B1 * | 6/2003 | Butler et al. | 345/761 |
| 6,583,771 B1 * | 6/2003 | Furuhashi et al. | 345/1.1 |
| 2002/0067318 A1 * | 6/2002 | Matsuzaki et al. | 345/1.1 |

* cited by examiner

METHOD AND APPARATUS FOR RENDERING AN IMAGE IN A VIDEO GRAPHICS ADAPTER

FIELD OF THE INVENTION

The present invention relates generally to the rendering of data in a video graphics system, and more particularly to a method and apparatus for rendering active video using more than one video adapter.

BACKGROUND OF THE INVENTION

FIG. 1 illustrates a prior art system for rendering video data in a computer system. Specifically, the prior art system of FIG. 1 illustrates a video-input signal being received by a video decoder. Such a video-input signal could be from a television, VCR, DVD player, or compressed video data. The received video data is decoded, as necessary by the video decoder which and provides a video-output across the PCI bus to the video memory associated with the graphics adapter of FIG. 1. The data stored within the video memory is then displayed on the graphics device which is also connected to the graphics adapter.

The prior art configuration of FIG. 1 can be inefficient because of the need to transport the video data across the PCI bus. In order for the decoded data to be stored within the graphics adapter's video memory, it is necessary for the video decoder to have its PCI bus control logic to store the rendered video information within the video memory. The hardware necessary for the video decoder to interface to the PCI bus is costly in terms of space and design implementation. Another inefficiency of the system of FIG. 1 is the use of PCI bandwidth by the video decoder when transmitting the data to the video memory. The video decoder is capable of performing the data transfer, and does not require system processor intervention. However, the system processor can be stalled if it needs to access the PCI bus during a transfer of video data by the video decoder. Therefore, the bandwidth used by the video decoder can prevent a system processor, or any other peripheral requiring the PCI bus, from functioning optimally when unable to access the PCI bus. For example, for a 320-by-240 pixel screen the number of bytes of data that need to be transferred each second between the video decoder and the video memory would be at least 320×240×2 bytes×60 frames per second.

FIG. 2 illustrates a second prior art solution to overcome these problems. In the prior art system of FIG. 2, the video input is received by the video decoder in the same manner as discussed with FIG. 1. However, the decoded data is not transferred to the graphics adapter across the PCI bus. Instead, the decompressed data is transferred across a dedicated local bus. By transmitting the video data from the decoder to the graphics adapter across the dedicated bus, the bandwidth associated with its use of the PCI bus is eliminated, thereby freeing PCI bandwidth for other peripherals or CPU. In addition, the use of a dedicated local bus allows for the expensive PCI hardware associated with the video controller of FIG. 1 to be avoided.

In general, the control circuitry associated with the local bus of FIG. 2 is inconsequential as compared to the overhead associated with the PCI bus of FIG. 1. The advantage of using the dedicated bus of the type in FIG. 2 is that it requires the video decoder to be connected to a single graphics adapter. With computer systems, such as Windows 98, it is necessary for the video decoder to be associated with the primary adapter on the PCI bus in order to display active video, where the primary adapter is the video adaptor first identified in the hardware by the operating system.

Therefore, a system that allows for a video-input signal to be displayed on a primary adapter, or any of a number of secondary video adapters, would be advantageous.

It should be understood that the figures included herein illustrate specific embodiments of the present invention. Other embodiments of the present invention may exist. Specific elements illustrated with the embodiments herein are not intended to represent actual size, location relationships between the components.

DETAILED DESCRIPTION OF THE DRAWINGS

In accordance with the present invention, a video source is received by a first video adapter. The video source is captured in the video memory associated with the first VGA. The stored video source is associated with a window of an existing application. When the window of the existing application is shifted to coincide with the video memory of a second graphics adapter, the first graphics adapter performs a memory access function across a systems bus to the appropriate video memory location with the second graphics adapter to allow the rendering of that portion of the video now residing on a second monitor. Such remote rendering allows for active video signals to be displayed on any secondary or primary video graphics adapter. This is an advantage over the prior art, which precluded the displaying of active video graphics on secondary graphics adapters.

Figure 1:
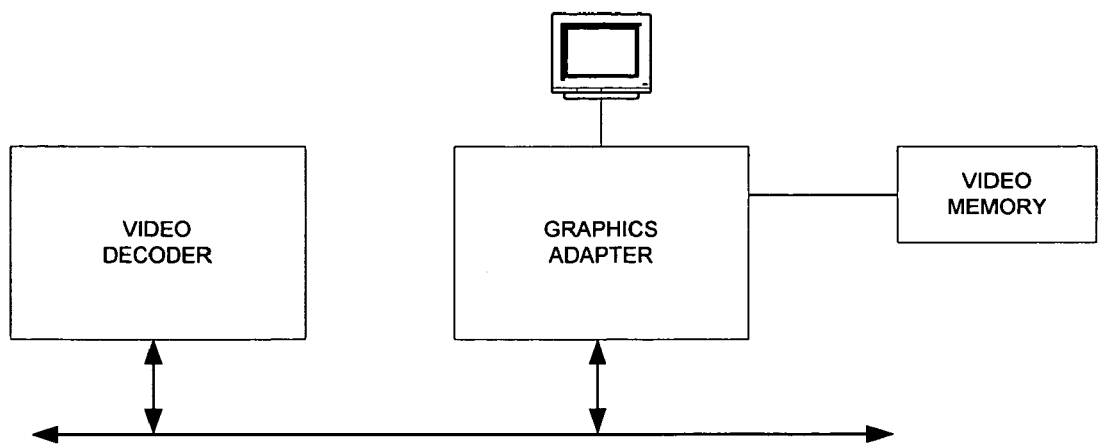
FIG. 1 illustrates in block diagram form a prior art implementation of a portion of a video system of a computer system.
Figure 2:
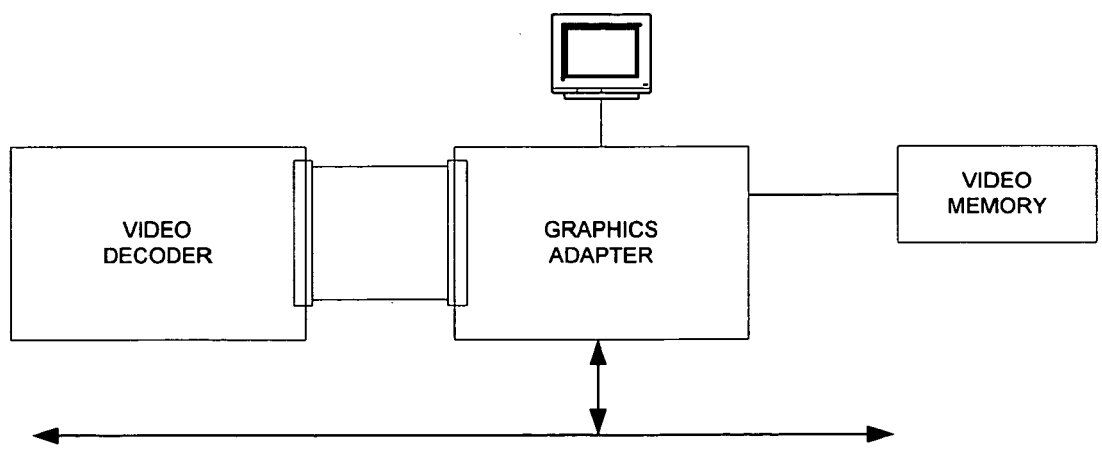
FIG. 2 illustrates in block diagram form a prior art version of another portion of a prior art video system of a computer system.
Figure 3:
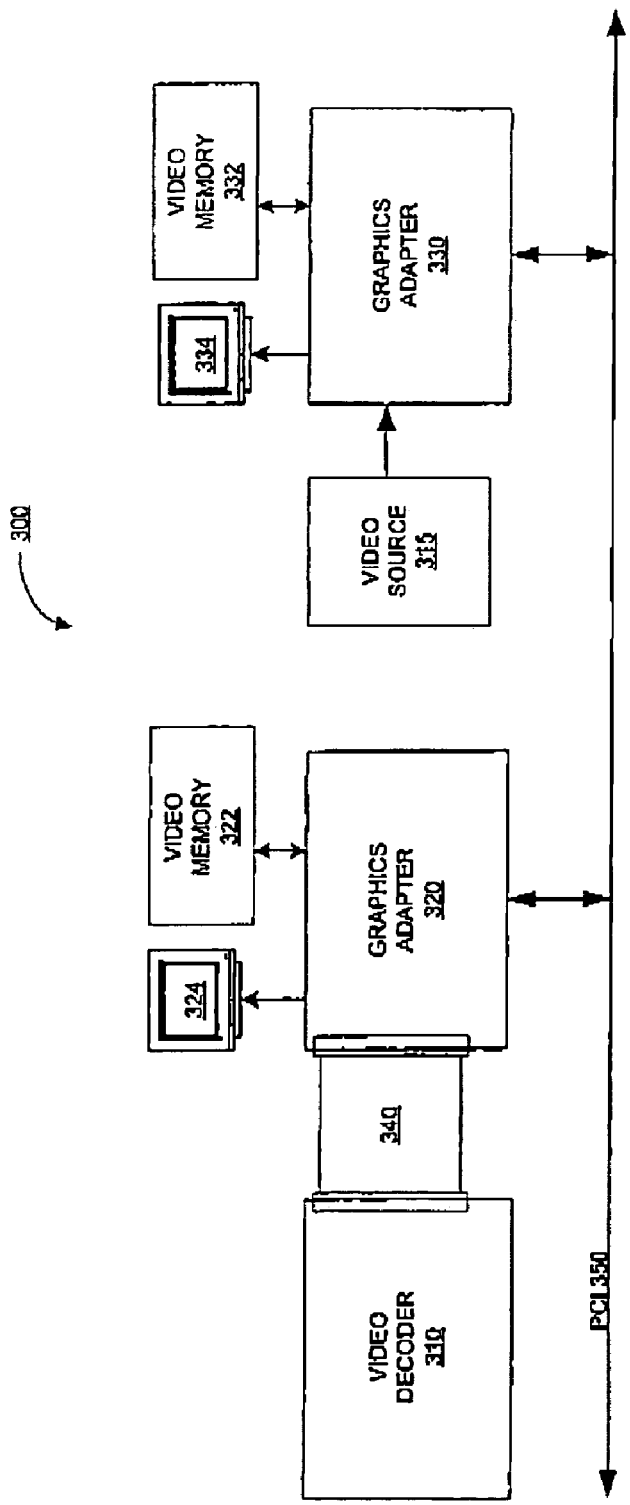
FIG. 3 illustrates in block diagram form the video portion of a computer system in accordance with the present invention.

FIG. 3 illustrates a portion of a computer system 300. The system 300 comprises a video decoder 310, a first graphics adapter 320, and a second graphics adapter 330. The video decoder 310 is connected to the first graphics adapter through the dedicated local bus 340. The dedicated local bus 340 is connected to the video decoder 310 at a port 311, and the first graphics adapter at port 321. The graphics adapter 320 is bi-directionally connected to system bus 350. The system bus 350 is illustrated to be a PCI bus, however any industry standard or proprietary bus capable of transmitting data at speeds appropriate to support video applications are anticipated by the present invention. The graphics adapter 320 has a video memory 322, which is accessed locally by the adapter 320, for storing video data to be displayed on the monitor 324 which is connected to the graphics adapter 320. The graphics adapter 330 is bi-directionally connected to the PCI bus 350, has its own local video memory 332, and is connected to a monitor 334 where rendered data stored in video memory 322 is displayed.

The portion 300 may include discrete add-on cards in a general purpose computer, components integrated on a mother board, such as Application Specific Integrated circuits (ASICs) or data processors. This bus 340 may be any number of connectors, including ribbon cable connecting two separate add-on boards, a bus integrated onto a mother board, or connector pins associated with a bus where the video decoder actually plugs into the graphics adapter 340.

In operation, a video-in signal is received at the video decoder 310. The video-in signal can be representative of any number of video signals. For example, the video-in could be a compressed video signal such as an MPEG video signal, a DVD video signal, a video signal from a VCR, a television, or any other video source. The video decoder 310 converts the video-in to a video source signal usable by the graphics adapter 320. Once the video-in conversion process is completed by the decoder 310, the video source is transmitted across the dedicated local bus 340 to the graphics adapter 320. In other embodiments, the dedicated video bus 340 could be connected to other peripheral boards as well. However, in accordance with this specific embodiment, video data will not be transmitted across the system bus 350. The data transmitted across the bus 340 is captured into the video memory 322 by the graphics adapter 320. Once captured at the video memory 322, it is possible to retrieve the data from the video memory 322 and display it visually onto the monitor 324.

During normal operation the system 300 will be used in conjunction with an operating system, such as Windows 98 by Microsoft. Applications run under such an operating system would display the active video data, received by the video decoder and subsequently captured in the video memory 322, within an application window on monitor 324. The application window is specified by the operating system, and the graphics adapter renders data from the video memory 322 such that it can be displayed within the application window on monitor 324.

If the application window is moved to a different monitor, or a portion of the window is moved to a different monitor, such as monitor 334 associated with graphics adapter 330, the following sequence of events will occur. The operating system, in response to the user's inputs, would transmit operating system commands indicating the new window location. These operating system commands are interpreted by the graphics adapters 320 and 330 at memory 322. In response, the graphics adapter 330 will recognize that a portion of its video memory is to be displayed. However, all of the video data to be displayed is still being received and stored by the graphics adapter 320. Therefore, it is necessary for graphics adapter 320 to recognize the application window previously being displayed exclusively on monitor 324 is now at least partially being displayed on monitor 334. In response, the graphics adapter 320 will determine that portion of it video memory 322 that is now to be displayed by the adapter 330. This portion of the memory 322 will be sent to the adapter 330 using a transfer technique, such as a DMA transfer. DMA hardware capable of transmitting the video to the appropriate video memory location in video memory 332 can be located on VGA 320.

Once the video data associated with the screen 334 is stored within the video memory 332, it is possible for the graphics adapter 330 to render this data as an image on the monitor 334. Note that in one embodiment, as video input continues to be received at the decoder, and transmitted across the dedicated local bus 340 to the graphics adapter 320, it would be necessary for a DMA controller within the graphics adapter 320 to continue to transfer the data from the video memory 322 across the PCI bus to the video memory 332 of graphics adapter 330. In this manner, it is possible for video data to be displayed on multiple display devices.

In one embodiment of the present invention, the video source data received on a dedicated local bus 340 will continue to be stored in the video memory 322, and the portion of video memory 320 needed at the remote graphics adapter 330 would be transmitted across the PCI bus as received and/or needed. In another embodiment, it would be possible to incorporate appropriate hardware to the graphics adapter 320 capable of monitoring data being received across the remote local bus 340, and transferring data that is rendered only on the adapter 330 directly to the adapter 330 without first saving it to memory 322. In a specific embodiment where video is to be mirrored on the monitors 324 and 334, it would be necessary for the video memory 322, and the video memory 332 to contain the same data information. Note, however, the video information stored within each of the two memories 322 and 332 would not necessarily be stored at the same memory location within each of the respective memories 322, and 332.

In accordance with the present invention, either graphics adapter 320, or the graphics adapter 330 may be the primary graphics adapter. The term "primary graphics adapter" refers specifically to the plug-and-play terminology of Windows 98 operating system, where the first video graphics adapter recognized during the start-up routine is considered the primary video adapter by the operating system. Under Windows 98, only a primary adapter can be operationally connected to a video decoder as indicated in FIG. 3. An advantage of the present invention is that one or more secondary video adapters may actually be connected to a video decoder 310 for receiving video data.

Yet another advantage of the present invention is that multiple video sources can be associated with the system 300. For example, a second video source 315 can be connected through its own dedicated bus to the graphics adapter 330. The video source 315 can be a second video decoder, television, videocassette recorder, or any other video source. The second video source 315 provides a video-out signal (a video source) to the adapter 330, which would be a video source relative to the adapter 330. In this situation, it would be possible for the multiple video-in sources to be displayed upon any of the monitoring devices of the present system. It should also be understood by one skilled in the art that the present invention is not limited to two graphics adapters or two video decoders. For example, a video wall concept could be used. A video wall refers to a technique whereby multiple display devices are stacked on top and beside each other in an array fashion to display a video image on a large scale. For example, four monitors can be arranged in a 2-by-2 grid, where each monitor would be displaying approximately one-quarter of the video-in signal. Using this technique, the video-in signal would be received by the video decoder 310 transmitted across dedicated bus 340 to the graphics adapter 320 and stored in its memory 322. Next, the DMA associated with the graphics adapter 321 will transmit one-quarter of the data stored in video memory 322 to a first video memory, a second quarter to a second video memory, and the third quarter to a third video memory. Thereby, each of the video memories would have approximately a quarter of the data, and all of the data it needs to display its quadrant on the wall monitor.

Figure 4:
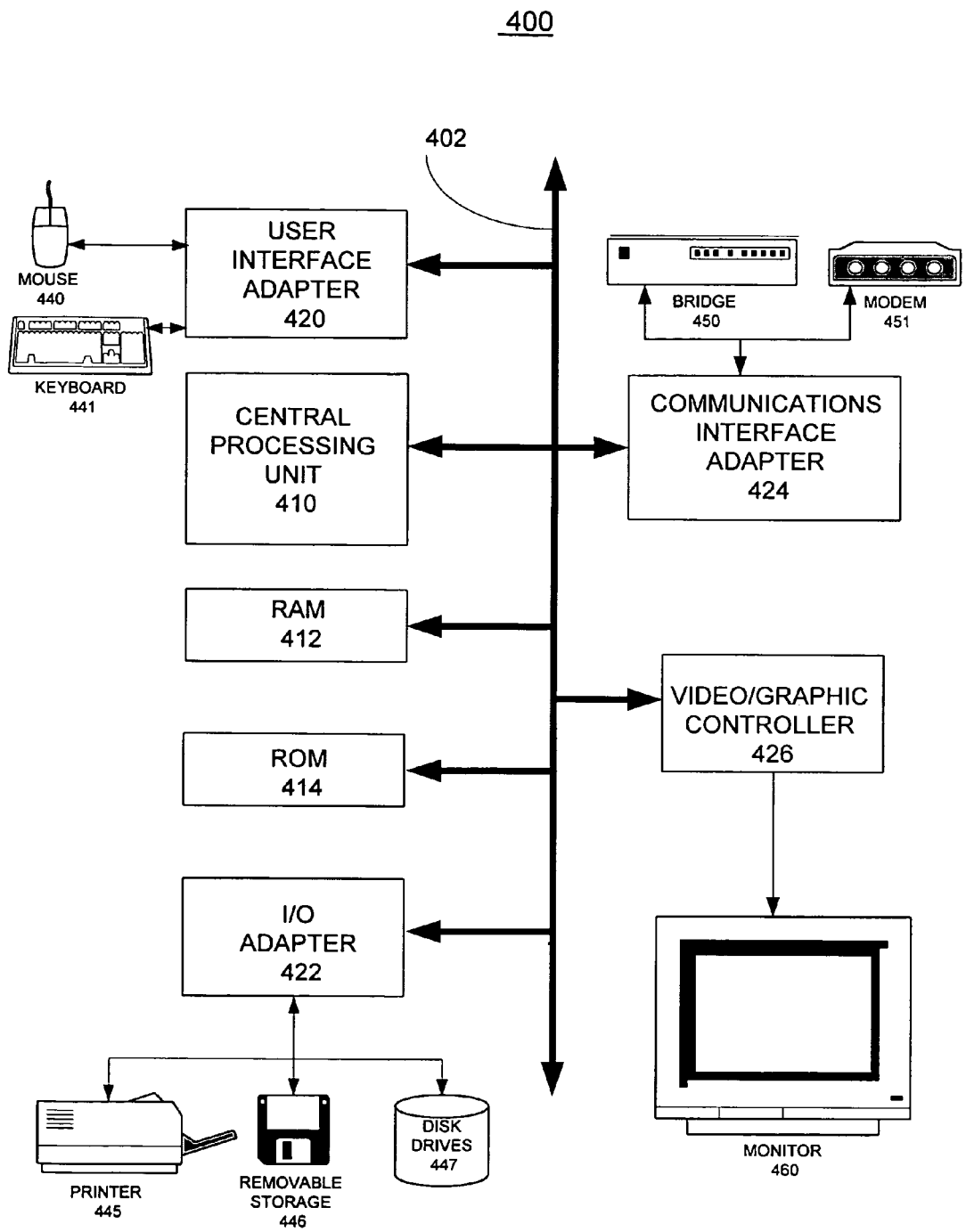
FIG. 4 illustrates in flow diagram form a method for implementing a graphics control method in accordance with the present invention; and, FIG. 5 illustrates a block diagram of a data processing in which specific embodiments of the present invention can be implemented.

FIG. 4 illustrates a data processing system 400, such as may be used to implement the present invention, and would be used to implement the various methodologies, or incorporate the various hardware disclosed herein.

The system of FIG. 4 includes a central processing unit (CPU) 410, which may be a conventional or proprietary data processor, and a number of other units interconnected via system bus 402.

The other units include random access memory (RAM) 412, read-only memory (ROM) 414, and input/output (I/O) adapter 422 for connecting peripheral devices, a user interface adapter 420 for connecting user interface devices, a communication adapter 424 for connecting the system 400 to a data processing network, and a video/graphic controller for displaying video and graphic information.

The I/O adapter is further connected to disk drives 447, printers 445, removable storage devices 446, and tape units (not shown) via bus 402. Other storage devices may also be interface to the bus 412 through the I/O adapter 422.

The user interface adapter 420 is connected to a keyboard device 440 and a mouse 441. Other user interface devices such as a touch screen device (not shown) may also be coupled to the system bus 402 through the user interface adapter 420.

A communication adapter 424 is connected to bridge 450 and/or modem 451. Furthermore, a video/graphic controller 426S connects the system bus 402 to a display device 460.

In operation, the bus 402 could correspond to the PCI bus 350 of FIG. 3, and the video graphics adapters would be connected to bus 402 in the same manner as controller 426. In addition, methods associated with the present invention, if any, may be implemented and stored on computer readable media such as one or more of the storage devices 445, 446, and 447 for subsequent processing by CPU 410. Since the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Figure 5:
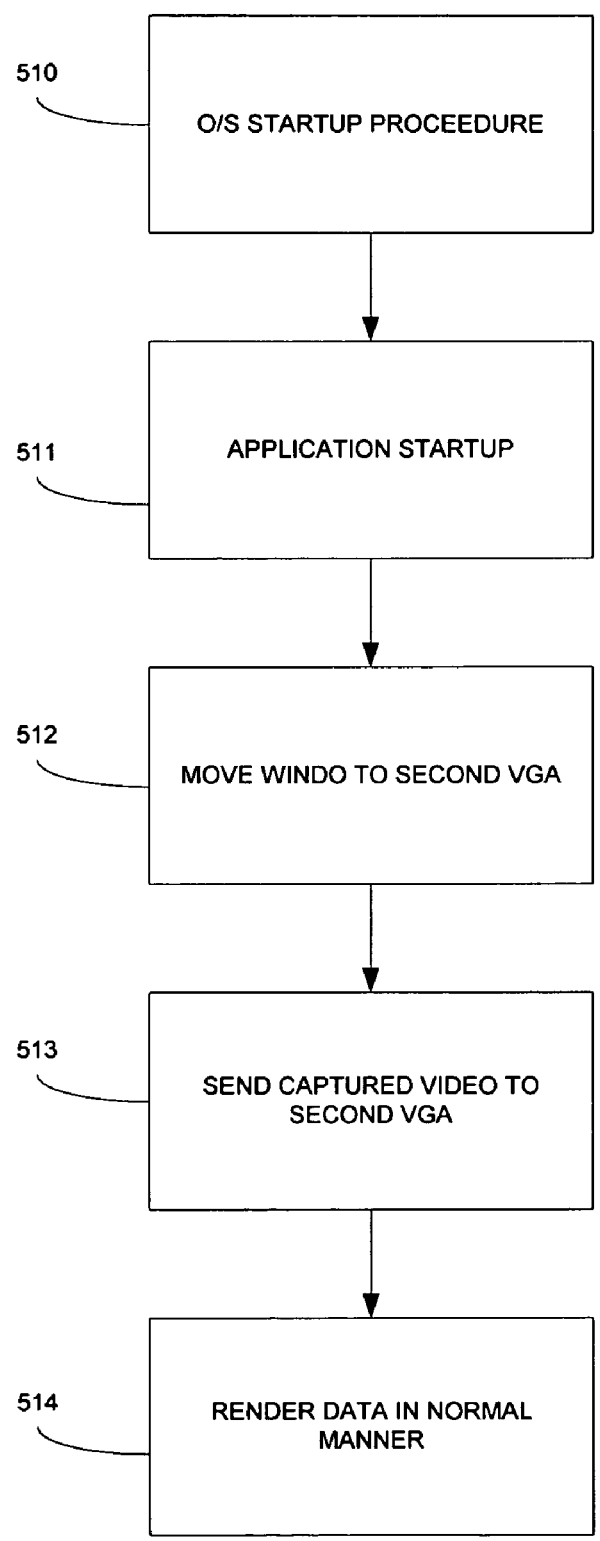

FIG. 5 illustrates a method in accordance with the present invention. At step 510, an operating system start-up procedure occurs. It is during such a start-up procedure, that the operating system determines what hardware is present in the system, and in response, defines the system including a system memory map. For example, with reference to FIG. 3, the operating system start-up procedure needs to recognize that two graphics adapters 320 and 330 exist in the system, and that the graphics adapter 320 has a video decoder 310 associated with it. In addition, the start-up procedure would also recognizes the amount of video memory associated with the first graphics adapter and the amount of video memory 322 associated with the second video graphics adapter. Based upon this information, the video memories 322 and 332 would be memory mapped into the PCI bus 350.

One method of recognizing the video decoder 310 on remote bus 340 is put forth in patent application, entitled "Method and Apparatus for Configuring a Computer System, filed on Mar. 19, 1999, and having application Ser. No. 09/272,464, owned by instant Assignee and is hereby incorporated by reference.

Next, in step 511, an application start-up occurs. In a specific embodiment, the application is an active video application whereby an active video signal is received and displayed within a window opened by, or for, the application. For example, if a user chooses to watch a television program on a computer screen, an application capable of displaying such a television program would be executed.

During start-up of the video application, a window would be defined and transmitted across the system by the operating system. As part of the system information, the first video graphics controller will interpret the operating system information and, as a result, begin storing the actual video source information within its memory for display in the window itself. With an operation system such as Windows 98, this would be accomplished by the primary video graphics adapter. Therefore, the primary video graphics adapter will capture the data, and render it onto the screen in the window defined by the system.

Next, at step 512, a window move command is interpreted by a second video graphics adapter. This occurs when a user input defines that a window is supposed to be displayed at least partially on a second display device. For example, if a user drags a window displaying active video graphics from a first monitor across to a second monitor, a command would be transmitted across the operating system and intercepted by both the first video graphics adapter and the second video graphics adapter. In other embodiments, it would be possible to display a portion of the window on each of the two display devices, or it would be possible even to have multiple windows displaying the same video data on multiple systems.

Once the first video system recognizes that a portion of the window has moved to a monitor controlled by a different video controller, it will send the captured video to the second VGA. Generally, this would be accomplished across the system bus, such as the PCI bus. This is done generally by a direct memory access (DMA) type device that is controlled by the adapter that monitors systems calls, and is aware of the new location in the other adapter where to map the captured data. One of ordinary skill in the art will recognize that in other implementations, instead of having a DMA sending the captured data to the second video graphics adapters memory, it would be possible to intercept the data before it is stored in the first VGA's memory, thereby keeping just one copy at the location needed (the second VGA).

Next, at step 514, the video data associated with each of the VGA's, now stored in their respective local memories, is rendered in a normal manner such that it is displayed on a screen.

The present invention has been put forth in terms of specific embodiments not intended to be limiting to the invention itself. Other specific implementations of the present invention are possible. For example, in FIG. 3, bus other than a PCI bus may be used. The present invention is advantageous over the prior art in that a video-in signal can be display by any graphics adapter in the system.

I claim:

1. A method of displaying active video on a computer system, the method comprising the steps of:

receiving at a first video graphics adapter (VGA) a first frame of active video from a video source;

rendering at least a first portion of the first frame of active video at the first VGA in response to a first control signal, wherein the first control signal is a signal specifying a window location for displaying the active video;

storing at least a first portion of the active video in a video memory in a memory location mapped to the first VGA;

rendering at least a second portion of the first frame of video at a second VGA in response to a second control signal and storing at least the second portion of the active video in a video memory in a memory location mapped to the first VGA; and sending the first frame of data over a local bus of the first VGA and the first video graphics adapter sending a portion of the first frame for the second video graphics adapter via a non-local bus.

2. The method of claim 1, wherein the first portion and the second portion are the same portion.

3. The method of claim 1, wherein the first video memory and second video memory are accessed by a direct memory access (DMA) controller associated with the first VGA.

4. The method of claim 1, wherein the first video memory and second video memory are accessed by a direct memory access (DMA) controller on the second VGA.

5. The method of claim 1, wherein the first VGA is a primary VGA, and the second VGA is a secondary VGA.

6. The method of claim 1, wherein the first VGA is a secondary VGA, and the second VGA is a primary VGA.

7. The method of claim 1, wherein the first VGA and the second VGA are part of a video wall such that the first frame of active video is displayed across multiple displays simultaneously.

8. The method of claim 1 further comprising the steps of:
receiving at the second VGA a second frame of active video from a second video source; and
rendering at least a portion of the second frame of video at the first VGA.

9. The method of claim 1 further comprising the step of storing the window location in a preference file.

10. The method of claim 1 including storing at least a first portion of the active video in the video memory by accessing the video memory locally by the first VGA and storing at least the second portion of the active video in the video memory accessed locally by the first VGA.

11. A method of displaying active video on a computer system, the method comprising the steps of:
receiving at a first video graphics adapter (VGA) a first frame of active video from a video source, wherein the video source is at least one of the following: a video decoder and a television signal;
storing the first frame of active video in a video memory in a memory location mapped to the first VGA;
displaying at least a first portion of the first frame of video at a second VGA in response to a second control signal, wherein the second control signal is a signal specifying a window location for displaying the active video; and
wherein storing the first frame of active video in the video memory includes locally accessing the video memory by the first VGA.

12. The method of claim 11, wherein the video decoder is for decoding a compressed video signal.

13. The method of claim 11, wherein the method further comprises the video source sending the first frame of data over a bus local to the first VGA.

14. An active video processing system comprising:
a first video graphics adapter (VGA) operative to receive a first frame of active video data, and in response display at least a first portion of the first frame of active video data at a window location in response to a first control signal;
a first video memory having a memory location mapped to the first VGA and operative to store at least the first portion of the active video data;
a second VGA, operatively coupled to the first VGA and operative to receive the at least a second portion of the first frame of active video data, and in response to display at least the second portion of the first frame of active video data;
a second video memory having a memory location mapped to the second VGA and operative to store at least the second portion of the active video data; and
wherein the first video memory is locally accessible by the first VGA and wherein the second video memory is locally accessible by the second VGA.

15. The active video processing system of claim 14, wherein the first VGA receives the first control signal when the first VGA receives a command to display at least the second portion of the first frame of active video data on the second VGA.

16. The active video processing system of claim 14, wherein the first VGA further includes a video graphics processor, and the second VGA further includes a video graphics processor.

17. The active video processing system of claim 14, wherein the window operates in conjunction with an operating system, such that the operating system supports the display of the active video data on the first VGA.

18. The active video processing system of claim 14, wherein the window operates in conjunction with an operating system, such that the operating system supports a program for providing the active video data only to the first VGA.

19. The active video processing system of claim 14, wherein the first portion and the second portion are the same portion.

20. The active video processing system of claim 14, further including a direct memory access (DMA), wherein the first video memory and second video memory are accessed by a direct memory access (DMA) controller associated with the first VGA.

21. The active video processing system of claim 14, further including a direct memory access, wherein the first video memory and second video memory are accessed by the DMA's controller associated with the second VGA.

22. The active video processing system of claim 14, wherein the first VGA is a primary VGA, and the second VGA is a secondary VGA.

23. The active video processing system of claim 14, wherein the first VGA is a secondary VGA, and the second VGA is a primary VGA.

24. The active video processing system of claim 14, wherein the first VGA and the second VGA are part of a video wall, such that the first frame of active video is displayed across multiple displays simultaneously.

25. The active video processing system of claim 14 further comprising the steps of:
receiving at the second VGA a second frame of active video from a second video source; and
rendering at least a portion of the second frame of video at the first VGA.

* * * * *